UNITED STATES PATENT OFFICE.

HAROLD ROBERT RAFSKY, OF LAWRENCE, MASSACHUSETTS.

COATED PAPER.

1,374,112. Specification of Letters Patent. Patented Apr. 5, 1921.

No Drawing. Original application filed March 29, 1916, Serial No. 87,624. Divided and this application filed August 7, 1917, Serial No. 184,825. Renewed August 19, 1920. Serial No. 404,714.

*To all whom it may concern:*

Be it known that I, HAROLD R. RAFSKY, a citizen of the United States, residing at Lawrence, in the county of Essex and State of Massachusetts, have invented certain new and useful Improvements in Coated Paper, of which the following is a specification.

My invention relates to a white pigment and a coated paper produced therewith.

My pigment is a substitute for coating materials producing a glossy surface and is intended to replace them wholly or in part in coated paper. The surface of the paper coated with my pigment possesses approximately the same gloss as that coated with clay. Paper coated with my pigment and which is intended for printing is suitable for the production of fine printing results. It possesses a lesser gloss than that coated with satin white and can therefore be viewed with less strain upon the eyes. My pigment is relatively inexpensive to produce and will find extensive use because of this fact.

In the production of my pigment or coating for the application to the surface of paper "body stock," I take a suitable dolomitic lime or other suitable lime containing magnesia (MgO), and preferably slake the same with water. I do not restrict myself to a lime of definite magnesia (MgO) content because I have found limes of various magnesia (MgO) contents suitable for my purpose.

Then, preferably after the slaking has been completed, I add sodium carbonate ($Na_2CO_3$) either in solution or other convenient form.

The mixture is then preferably agitated and boiled for a sufficient length of time whereupon there is produced an essentially insoluble material and a solution of sodium hydroxid (NaOH), containing more or less sodium carbonate ($Na_2CO_3$) according to the original proportions in which the reacting substances were added. The exact composition of the insoluble material is not as yet known, but it seems most probable that it contains chiefly calcium carbonate ($CaCO_3$) and magnesium hydroxid ($Mg(OH)_2$), although it is entirely possible that there may be present greater or lesser amounts of other magnesium compounds, such as the oxid, carbonate, or basic modifications of one or more of these compounds. It is understood that other impurities may be present depending upon the purity of the raw materials employed.

Analyses of this insoluble material indicate that it consists chiefly of calcium carbonate and a magnesium compound believed to be magnesium hydroxid. From the analytical data, it is probable that some other compound or compounds of the alkaline earth metals in question is or are present in small amounts, but the exact nature of such compound or compounds has not been determined.

Of course it is understood that by using limes of varying magnesia contents, the quantitative composition of the material produced will be changed, but the material still retains the same general qualitative character.

This material produced as indicated above is of extremely fine grain and consequently settles very poorly. It is therefore filter-pressed, washed and sieved, or these operations may be interchanged or divided into stages as desired. The material may now be used directly as a pigment for coating paper, or it may be dried first as desired.

With the addition of a suitable adhesive, or mixture of adhesives, the pigment may be used directly for coating paper "body stock" employing the machines generally used for this purpose; or there may be admixed with the pigment and adhesive mixture other organic materials, adhesive or otherwise, or inorganic materials, or a combination of both classes of substances, such as may be used in the manufacture of "coated" paper and the entire mixture used to coat paper "body stock," employing the machines generally used for the production of "art" or "coated" paper. The "coated" paper produced may be calendered or otherwise finished as desired.

The words "coated paper" in this application are to be understood as referring to all types of paper of all weights such as are coated commercially.

Of course it is understood that with change in the severity of the calendering corresponding changes will be apparent in the degree of gloss imparted to the surface of the paper, but in general it may be stated that these changes correspond approximately to the changes taking place under similar conditions with a clay coated paper.

The subject matter of the present application is disclosed but not claimed in my copending application for new and useful white pigment, filed March 29, 1916, Serial No. 87,624, of which the present application is a division.

It is to be understood that the form of my invention herewith shown and described is to be taken as a preferred example thereof, and that various changes may be resorted to in the practice of my invention without departing from the spirit of the invention or the scope of the subjoined claims.

Having thus described my invention, I claim:

1. A paper comprising a paper "body stock" having its surface coated with a pigment produced by the interaction of a lime containing magnesia and sodium carbonate ($Na_2CO_3$) in an aqueous medium, and an adhesive.

2. A paper comprising a paper "body stock" having its surface coated with a pigment produced by the interaction of a slaked lime containing magnesia and sodium carbonate in an aqueous medium, and an adhesive.

In testimony whereof I affix my signature in presence of two witnesses.

HAROLD ROBERT RAFSKY.

Witnesses:
ROLAND B. HAMMOND,
DENNIS J. MCNAMARA.